United States Patent [19]

Brendemuehl

[11] 4,358,725
[45] Nov. 9, 1982

[54] STEPPER MOTOR CONTROL CIRCUIT

[75] Inventor: Roger C. Brendemuehl, Beloit, Wis.

[73] Assignee: Beloit Corporation, Beloit, Wis.

[21] Appl. No.: 189,911

[22] Filed: Sep. 23, 1980

[51] Int. Cl.³ ............................................. G05B 19/40
[52] U.S. Cl. ..................................... 318/696; 318/685
[58] Field of Search ................................ 318/685, 696

[56] References Cited

U.S. PATENT DOCUMENTS

| | | | |
|---|---|---|---|
| 3,750,000 | 7/1973 | Bruckner et al. | 318/696 |
| 3,812,413 | 5/1974 | Keidl | 318/696 |
| 3,826,966 | 7/1974 | Nagasaka et al. | 318/696 |
| 4,129,816 | 12/1978 | Feldy et al. | 318/696 |
| 4,293,807 | 10/1981 | Foster et al. | 318/696 |

Primary Examiner—David Smith, Jr.
Assistant Examiner—G. Z. Rubinson
Attorney, Agent, or Firm—Hill, Van Santen, Steadman, Chiara & Simpson

[57] ABSTRACT

A stepper motor control circuit for a step motor and step motor control which has substantially higher efficiency than the motors and the control circuits of the prior art and which uses a chopper current control and phase control for each of the two phases of a two phase step motor and wherein each phase has two separate windings that are magnetically coupled together. The invention provides a three step switching sequence which produces different current paths in each step so that a higher operating efficiency is achieved than circuits in the prior art.

13 Claims, 5 Drawing Figures

STEPPER MOTOR CONTROL CIRCUIT

BACKGROUND OF THE INVENTION

1. Field of the Invention

This invention relates in general to a control circuit for a step motor which is more efficient than the prior art circuits.

2. Description of the Prior Art

FIGS. 2 and 3 disclose prior art control circuits for step motors which require more power than the step motor control circuit of this invention.

SUMMARY OF THE INVENTION

The present invention relates to a control circuit for a step motor for driving a number of applications as, for example, a slitter assembly for a paper machine. Step motors and step control circuits are commercially available and stepping motors can be classified according to the specific design features of the motor. One type of motor used in a particular application is a permanent magnet two phase bifiler wound motor which is available from a number of manufacturers and is widely used.

The control circuits of the prior art are very inefficient particularly in power consumption and space requirements because the control requires the user to supply two large power resistors mounted external to the control. For instance, the power consumed in a specific commercially available system by the resistors and control for each motor is 144 watts when the motor is not running, in other words, when only providing holding torque and about 35 watts when the motor is operating at the maximum speed used on the particular application. This is opposite to the desired performance for good efficiency particularly on this paper machine application since the motors are actually running less than 5% of operating time and it would be desirable that low power be dissipated when motors are merely providing holding torque whereas the prior art device utilizes high power when holding torque is being provided.

The present invention utilizes a control circuit for a stepping motor of the so-called chopper "current control". This type of circuit eliminates the need for power external resistors which waste power and also provides for high efficiency power transfer to the motor. The circuit design of the invention provides for better power efficiency both when the motor is running and when it stands still than systems of the prior art. The invention achieves high operating efficiency and results in a improved apparatus.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
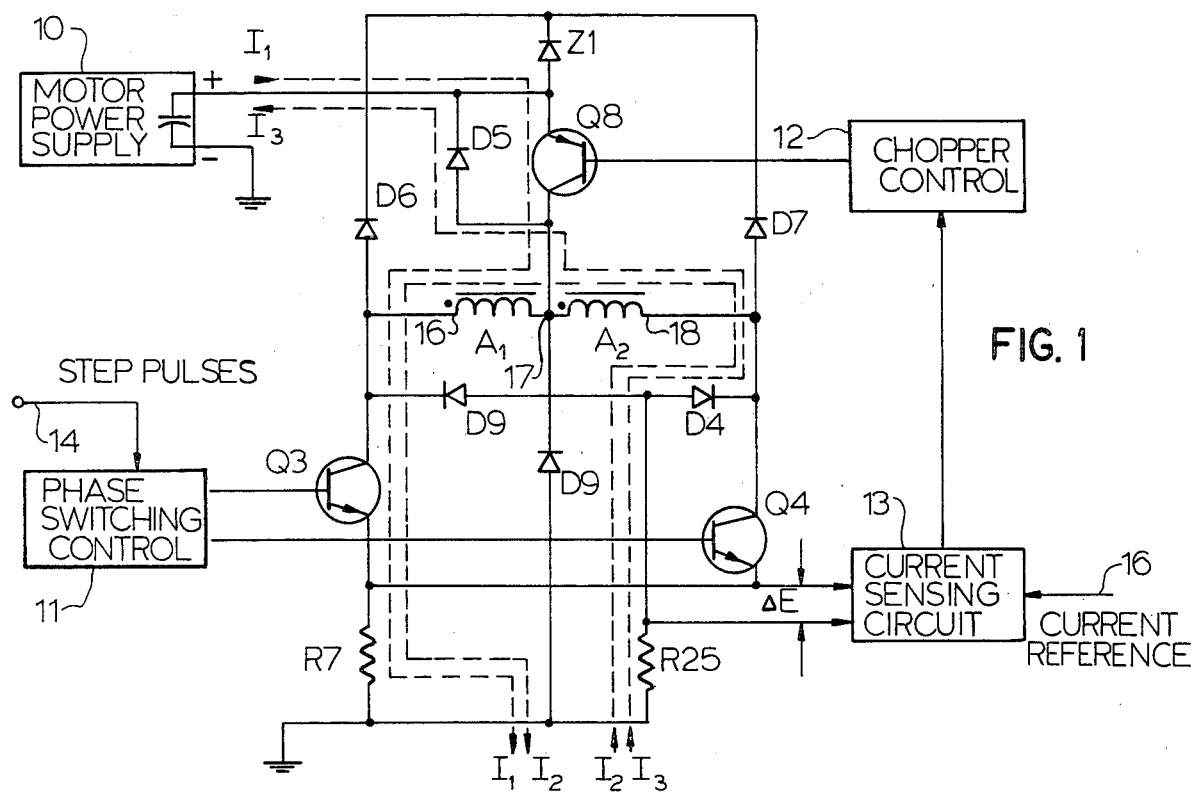
FIG. 1 illustrates the invention as applied to one phase of a stepping motor.
Figure 5A:
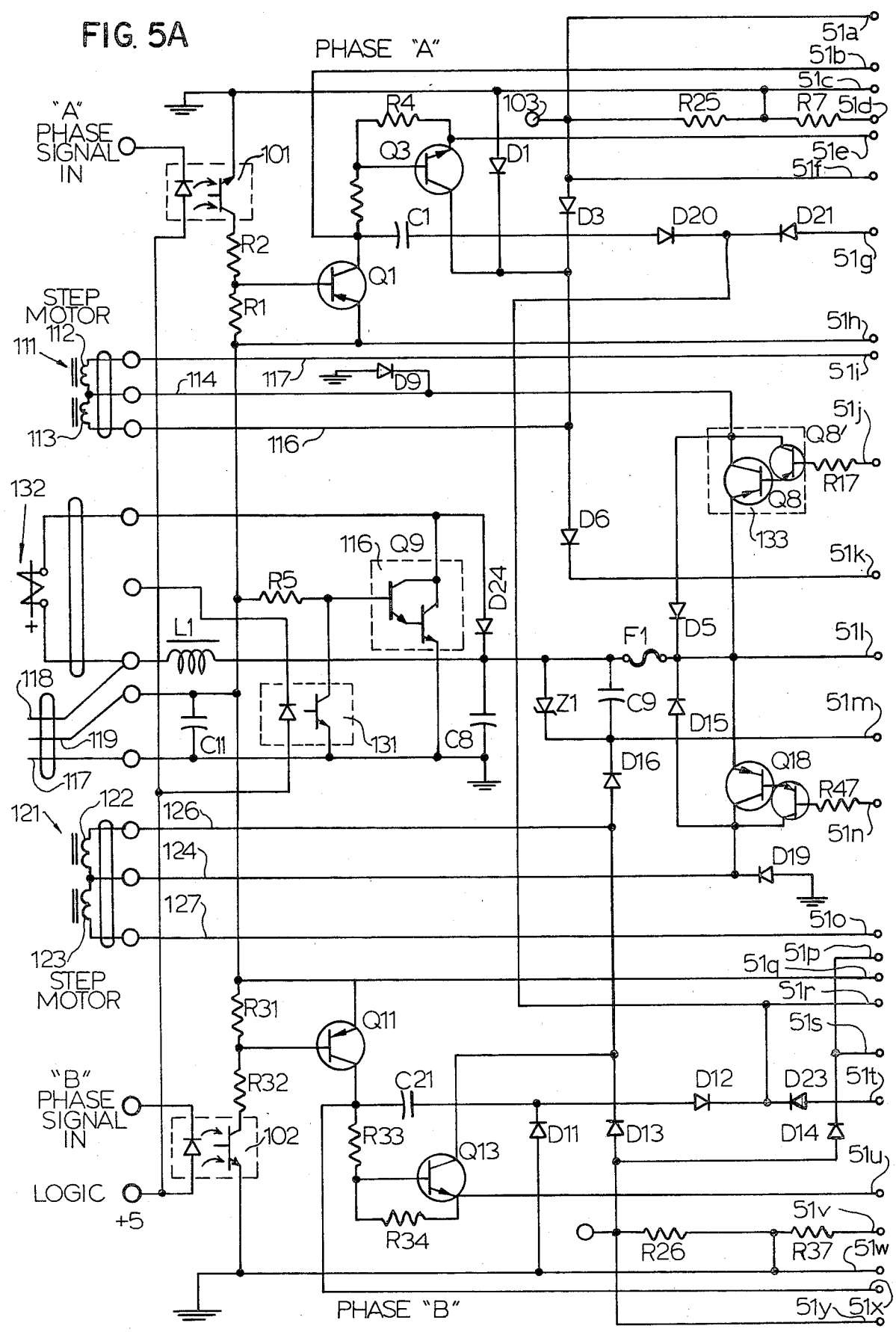
FIGS. 5A and 5B illustrate the complete electrical schematic of a two phase stepping motor.
Figure 5B:
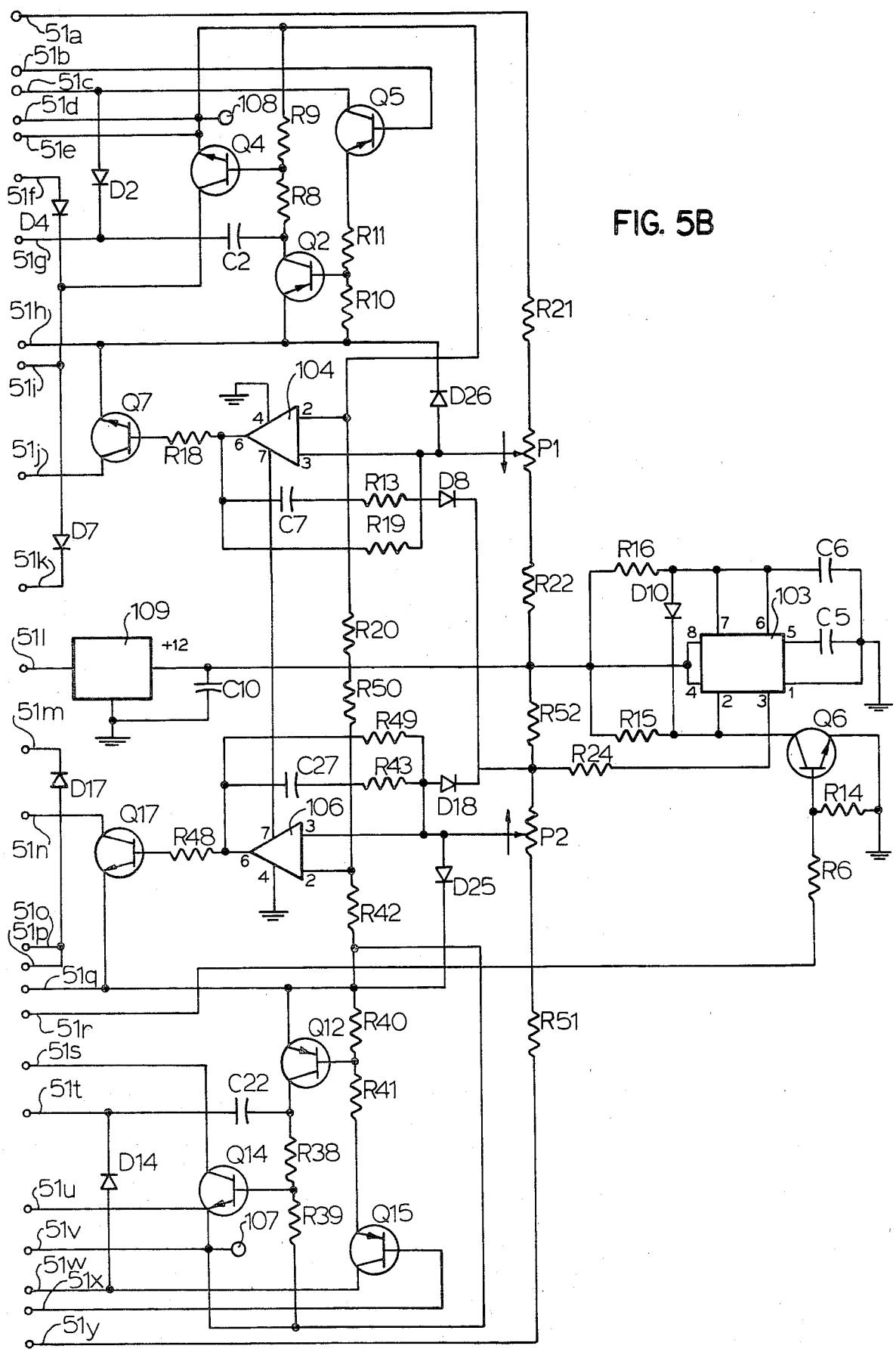

FIG. 1 illustrates an electrical schematic of a control circuit for a two phase stepping motor. Each phase of the stepping motor has two separate windings identified as winding A1 and winding A2 in FIG. 1. FIG. 1 illustrates the control circuit for only one of the phases of the two phase motor but it is to be realized that the second phase control circuit is identical to the control circuit for the first phase. FIGS. 5A and 5B illustrate an electrical schematic of an actual control circuit for both phases of a two phase motor and FIG. 1 is a simplified circuit diagram of the control for a single phase of the two phase system.

The windings A1 and A2 are magnetically coupled together and have the polarity illustrated by the dot on the left side of the windings.

A motor power supply 10 which may be a DC power supply has its negative side grounded and its plus side connected to the emitter of a transistor Q8 which comprises a chopper. The collector of the transistor Q8 is connected to the junction point 17 between the windings A1 and A2. The other end 16 of the winding A1 is connected to a diode D6 poled as shown which has its other side connected to a Zener diode Z1 which has its other side connected to diodes D6 and D7. A diode D5 is connected between the collector and emitter of the transistor Q8 and is poled as shown. The collector of transistor Q8 and the junction point 17 between the windings A1 and A2 is connected to ground through a diode D9 poled as shown. A phase switching control circuit 11 receives step pulses from a terminal 14 and supplies outputs to the bases of transistors Q3 and Q4 to turn them on and off. The collector of transistor Q3 is connected to end 16 of the winding A1 and the emitter of transistor Q3 is connected to a resistor R7 which has its other side grounded. The transistor Q4 has its collector connected to the end 18 of winding A2 and has its emitter connected to the emitter of transistor Q3 and to the input of a current sensing circuit 13. A diode D4 is connected between terminal 18 of winding A2 and a resistor R25 which has its other side connected to ground as shown. A diode D7 is connected from terminal 18 to Zener diode Z1. A chopper control 12 supplies a control output to the base of the chopper transistor Q8 and receives an input from the current sensing circuit 13. The current sensing circuit 13 receives a current reference signal from input terminal 16.

The control in one winding of each phase of the motor involves a three step switching sequence which produces different current paths during each step which are indicated in FIG. 1 by the currents I-1, I-2, and I-3. It is to be realized that as stated before, that there is a second phase of the motor which is identical to that illustrated in FIG. 1 but for simplicity it is not shown in FIG. 1, however, it is shown in the complete schematic of FIG. 5A and FIG. 5B where the elements illustrated in FIG. 1 are shown with the same designations.

In operation, higher operating efficiency than of circuits of the prior art is achieved with the step control circuit of the invention. When winding A1 is to be energized, the chopper transistor Q8 will be turned on as well as the phase select transistor Q3. During this time, current I-1 will flow from the plus side of the motor power supply 10 through the transistor Q8 then through the winding A1 then through transistor Q3 and resistor R7 to ground. The resistor R7 is the current sensing resistor and its grounded side is at the same potential as the negative terminal of the motor power supply 10. The magnitude of the current I-1 will increase at a rate which is determined by the voltage of the power supply 10 and the inductance of the motor winding A1. When the current increases to a magnitude slightly greater than the rated motor current, the voltage drop across the resistor R7 (ΔE) will initiate a response in the current sensing circuit 13 which will cause the chopper control 12 to turn chopper transistor Q8 off.

When transistor Q8 is turned off, a different path must be provided for the current which was flowing through motor winding A1. Since the windings A1 and A2 are magnetically coupled together, the counter emf generated by the decaying magnetic field will induce voltages in both of these windings and current will flow through both windings if a suitable path is provided. Such path is provided by a diode D4 poled as shown and a second current resistor R25. During this time, the current I-2 will flow as indicated by the dashed line designated by I-2 which flows from ground through the resistor R25, the diode D4 to the winding A2 then the winding A1 then through transistor Q3 and resistor R7 back to ground. Since both windings are energized, the magnetic circuit will have two times the number of effective turns since the windings A1 and A2 have the same number of turns and the magnitude of current I-2 will be exactly one-half the magnitude of the current I-1.

The motor torque however will remain the same since there has been no decrease in magnetic flux. Therefore, the circuit of the invention provides the same motor torque with only one-half of the rated motor current during step 2 of the control sequence. The winding losses in the motor will be equal to $I^2R$ where R is the resistance of the motor windings A1 and A2 combined. By utilizing both windings, R is increased by two times the resistance when only one winding is being energized but the current I is reduced by one-half so that the net power loss in the motor is reduced by one-half during the condition when current I-2 flows as compared to the condition when current I-1 is flowing. Also, the power loss in the circuit components in which I-2 is flowing comprising R25, D4, Q3 and R7 will also be reduced by 50%.

The current I-2 which is commonly referred to as a "free wheeling" current in control terminology will gradually decrease at a rate depending upon the inductance of the motor windings, the circuit component losses and the speed of the motor. When the motor is at a standstill, in other words, only providing holding torque for a load, the rate of decrease of current I-2 will be the least rapid.

When the current I-2 decreases to a value slightly below the rated motor current, as sensed by the voltage ΔE, the current sensing and chopper control circuits 13 and 12 will again turn the chopper transistor Q8 on and the current will flow through the path I-1 again. This cycle will repeat as long as the winding A1 is required to be energized as determined by the input control signals applied to the circuit.

The circuit of the invention permits current to flow through both windings during the "free wheeling" stage of the control cycle, thereby reducing the power losses in the motor and circuit by 50% which results in a greatly improved power saving circuit.

The third step in the control sequence is when the winding A1 is to be de-energized. When this occurs, both transistors Q3 and Q8 will be turned off by the phase switching control circuit 11 and with both transistors Q3 and Q8 turned off, current flowing through winding A1 will be interrupted because there is no complete circuit through this winding. Therefore, the current which was flowing in winding A1 will be instantly transferred by magnetic coupling to winding A2 and follow the path indicated by the dash line labeled I-3. I-3 flows from ground through resistor R25, diode D4, winding A2 then diode D5 to the positive side of the power supply 10. This current flow has been reversed and will be flowing into the power supply which means that energy is being supplied from the magnetic field of the motor back into the power supply which improves even more the efficiency of the circuit of the invention. After the current I-3 has decreased to zero, the transistors Q8 and Q4 will be turned on to energize winding A2 and the sequence control will be repeated.

The function of the components Z1, D6, D7 and D9 would not be required if the motor windings A1 and A2 were perfectly coupled, in other words, if the inductances of both windings were exactly equal and there was no leakage inductance. However, since perfect coupling cannot be achieved in a practical circuit transient voltages can be generated when current is switched from one winding to the other. The function of the Zener diode Z1 and the diodes D6, D7 and D9 is to clamp voltage transients so that the power transistors are not destroyed by over voltage. These components are not involved in control of the motor power and have no effect on the efficiency of the circuit but are merely used for protecting the transistors.

Figure 2:
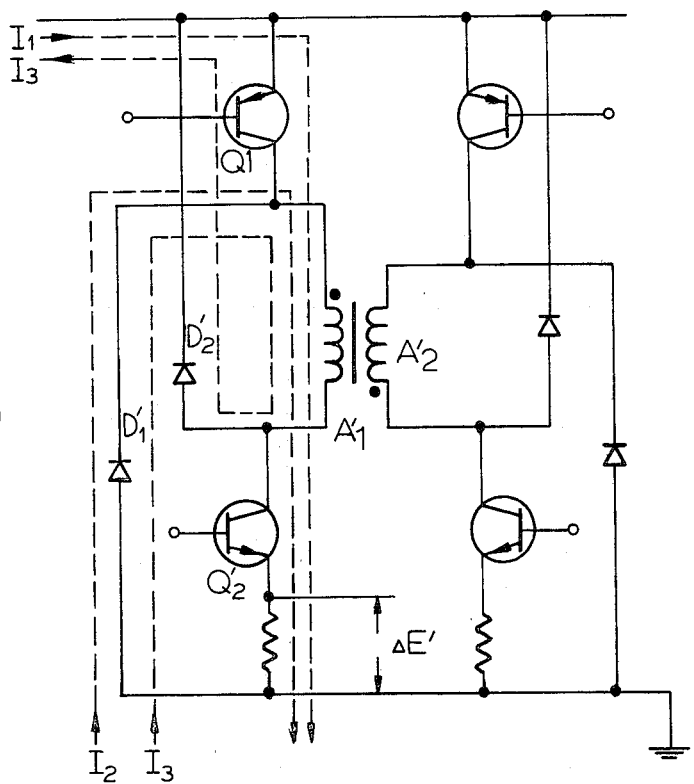
FIG. 2 illustrates a prior art control circuit.

Thus, the efficiency of the control circuit illustrated in FIG. 1 is substantially greater than the efficiency of the prior art circuits. For example, in the circuit of FIG. 2, which is a commercially available "chopper" type step motor control circuit available from Sigma Instruments, the currents I-1, I-2 and I-3 all flow through winding A1'. The free wheeling current I-2 does not flow through both of the windings A1' and A2'. Therefore, the current I-2 will be equal to the current I-1 and a 50% reduction in power loss is not achieved in the circuit of FIG. 2 as in the circuit of the invention.

Figure 3:
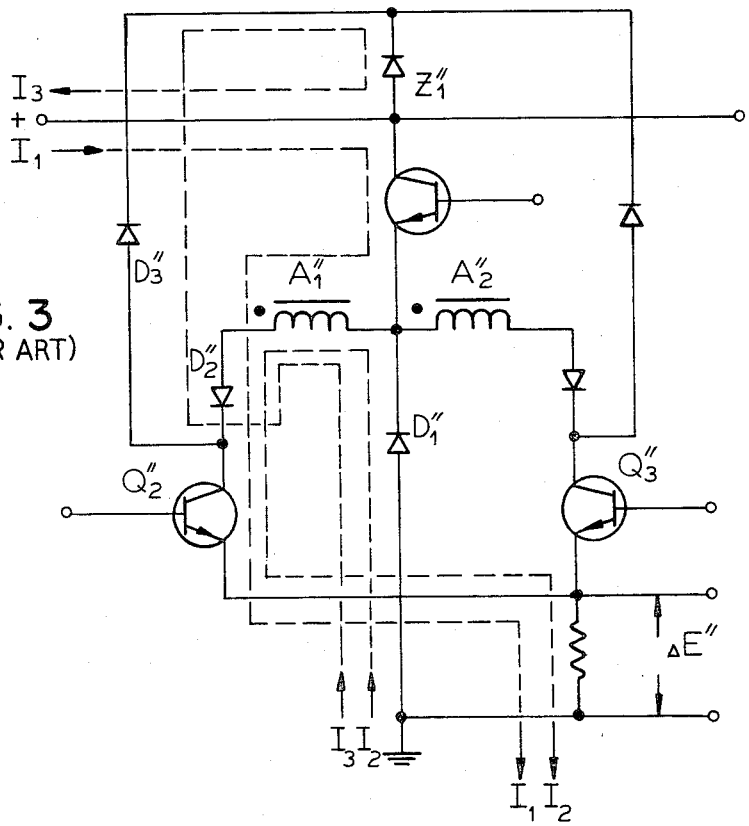
FIG. 3 illustrates a prior art control circuit.

FIG. 3 illustrates another chopper control circuit of the prior art available from North American Phillips and the currents I-1, I-2 and I-3 are illustrated which flow through the winding A1". Also, note in this circuit that during the "free wheeling" stage of operation such current does not flow through both of the windings but only flows through the winding A1" and thus a 50% reduction in power is not achieved as in the present invention.

Figure 4:
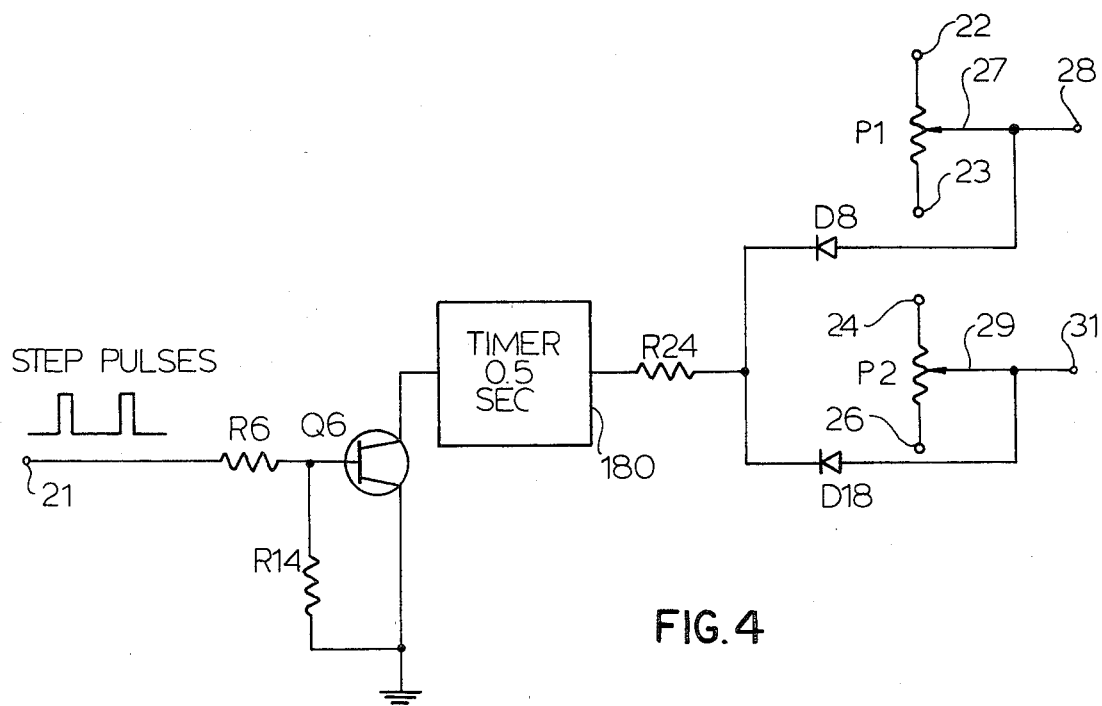
FIG. 4 illustrates a circuit for decreasing the current when the motor is not running.

FIG. 4 illustrates an additional circuit for increasing the efficiency and reducing power. As stated above, in certain applications, the step motors run less than 5% of the total operating time. When the motors are at a standstill, in other words, merely providing holding torque, full rated current is not required. Therefore, additional energy saving can be achieved by reducing the motor current after the motors have stopped. The circuit of FIG. 4 accomplishes this. Step pulses are received at input terminal 21 and supplied through resistor R6 and transistor Q6 to the timer 180 which might be an integrated circuit type 555 available on the open market and when input step pulses are not being received at terminal 21 the timer 180 will be reset and its output will be low. Current can then flow through the resistor R24, and the diodes D8 and D18 from terminals 28 and 31 respectively. This will reduce the reference current settings which are established by the settings of the wipers 27 and 29 on potentiometers P1 and P2 which are the referenced signals for phase A and phase B motor currents. The motor currents will thus be controlled at a value less than rated current. The percentage reduction is determined by the value of the resistor R24 which can be selected to achieve the percentage reduction in holding torque which can be tolerated for a particular application.

The step pulses which control the rotation of the motor when fed to the transistor Q6 will cause the transistor to set the timer 180 on the first received pulse causing the output of the timer 180 to go high blocking current flow through the diodes D8 and D18 and changing the current references instantaneously to the full rated current. Therefore, the full rated motor torque will be immediately available on the first step pulse received at terminal 21.

FIGS. 5A and 5B illustrate the complete control circuit for a two phase step motor which has a phase A and a phase B and wherein each of the phases have two separate windings. Phase A is illustrated at the upper portions of FIGS. 5A and 5B and the windings 113 and 112 respectively, corresponding to the winding A1 and A2 in FIG. 1. The A control phase signals are applied to the phase control 101 which can be a commercially available circuit type 4N33 which provides an output through the resistor R2 to the transistor Q1 which turns on the phase control transistor Q3 which is the same as transistor Q3 shown in FIG. 1. Transistor Q8 comprises the element 133 which receives an input through resistor R17 from a transistor Q7 which is controlled by an integrated circuit 104 which might be a type 748, for example. The B phase comprises the windings 122 and 123 of the step motor 121 which receives an input at B Phase Signal Input terminal which supplies an input to integrated circuit 102 which might be a type 4N33 which controls the chopper control transistors Q18 and Q18' which corresponds to the transistor Q8 and Q8' for the A phase. Integrated circuits illustrated in FIGS. 5A and 5B may be of the following types. Circuit 131 may be a 4N26, circuit 104 may be a type 748. Circuit 109 may be a type 3MC78L12. Circuit 103 may be an integrated circuit type 555.

Resistors may have the following values.
R1—220 ohms
R2—100 ohms
R3—22 ohms
R4—100 ohms
R5—2.7 K ohms
R7—0.15 ohms
R8—22 ohms
R10—1000 ohms
R11—680 ohms
R12—4.99 k ohms
R6—15 k ohms
R14—10 k ohms
R15—10 k ohms
R16—470 k ohms
R17—1 k ohms
R18—10 k ohms
R19—470 k ohms
R20—10 k ohms
R21—5.36 k ohms
R22—10 k ohms
R31—220 ohms
R32—100 ohms
R33—22 ohms
R34—100 ohms
R26—0.15 ohms
R37—0.15 ohms
R38—22 ohms
R39—100 ohms
R40—1 k ohm
R41—680 ohms
R47—1 k ohm
R48—10 k ohms
R42—4.99 k ohms
R49—470 ohms
R43—10 k ohms
R50—10 k ohms Transistors may be of the following types. Transistor Q1 may be a type MPS6562. Transistor Q2 may be a type MPS6562. Transistor Q3 may be a type 2N6101. Transistor Q4 may be a type 2N6101. Transistor Q5 may be a type 2N4126. Transistor Q6 may be a type 2N4124. Transistor Q7 may be a type 2N4124. Transistor Q11 may be a type MPS6562. Transistor Q12 may be a type MPS6562. Transistor Q13 may be a type 2N6101. Transistor Q14 may be a type 2N6101. Transistor Q15 may be a type 2N4126. Transistor Q17 may be a type 2N4124.

Capacitors may have the following values.
C1—0.005 MFD
C2—0.005 MFD
C11—250 MFD
C8—2400 MFD
C9—0.05 MFD
C6—0.01 MFD
C5—0.01 MFD
C7—0.002 MFD
C27—0.002 MFD
C22—0.005 MFD
C21—0.005 MFD It is seen that this invention provides new and novel control circuits for stepping motors which has greatly increased in efficiency over those of the prior art.

Although the invention has been described with respect to preferred embodiments, it is not to be so limited as changes and modifications may be made therein which are within the full intended scope as defined by the appended claims.

I claim as my invention:

1. A stepper motor control circuit for a stepper motor having at least a single phase comprising a pair of windings magnetically coupled together and joined together at first ends thereof, a direct current motor power supply with one terminal connected to a reference potential, a first electronic switch connected between the other terminal of said motor power supply and said first ends of said pair of windings, a chopper control connected to said first electronic switch to control it, a first resistor with one side connected to said reference potential, a second electronic switch connected between the second end of one of said pair of windings and the second side of said first resistor, a third electronic switch connected between said second end of said first resistor and the second end of the second of said pair of windings, a phase switching control receiving input step pulses connected to said second and third electronic switches to turn them on and off and a sensing circuit connected to said second electronic switch and said first resistor so as to sense the voltage drop across said first resistor and supplying an output to said chopper control, a second resistor connected between said reference potential and the second end of the second of said pair of windings.

2. A stepper motor control according to claim 1 wherein said first electronic switch is a first transistor.

3. A stepper motor control according to claim 1 wherein said second electronic switch is a second transistor.

4. A stepper motor control according to claim 1 wherein said third electronic switch is a third transistor.

5. A stepper motor control according to claim 2 including a first unilateral current device connected in parallel with said first transistor and poled to pass current in a direction opposite to the direction of current through said first transistor.

6. A stepper motor control according to claim 5 including second and third unilateral current devices connected back to back across the second ends of said pair of windings and said second resistor having one side connected to their junction point.

7. A stepper motor control according to claim 2 wherein the impedances of said pair of windings is substantially the same.

8. A stepper motor control according to claim 1 wherein during a first stage said chopper control turns said first electronic switch on and said phase control turns said second electronic switch on and said third electronic switch off.

9. A stepper motor control according to claim 8 wherein during a second stage said chopper control turns said first electronic switch off and said phase control turns said second electronic switch on.

10. A stepper motor control according to claim 6 wherein said chopper turns off said first electronic switch and said phase control turns off said second electronic switch to return power to said power supply.

11. A stepper motor control according to claim 7 including fourth and fifth unilateral current devices connected in series between the second ends of said pair of windings and poled to pass current toward their junction point and a zener diode connected between their junction point and the other terminal of said power supply.

12. A stepper motor control according to claim 11 including a sixth unilateral current device connected between reference potential and the junction point between said first ends of said pair of windings.

13. A stepper motor control circuit according to claim 2 including a circuit with high and low outputs with an input terminal to which motor control pulses are supplied, a timer a resistor with one side connected to the output of said timer, a pair of potentiometers across which reference potentials are supplied and their wiper contacts connected to the second side of said resistor such that when the stepper motor is stationary the circuit with high and low outputs is low and when the stepper motor is energized the output is high.

* * * * *